United States Patent [19]

Tsunoda et al.

[11] Patent Number: 4,533,153
[45] Date of Patent: Aug. 6, 1985

[54] FRONT BRAKE SYSTEM FOR MOTORCYCLES

[75] Inventors: Kazuhiko Tsunoda; Shigeru Hattori, both of Saitama, Japan

[73] Assignee: Honda Giken Kogyo Kabushiki Kaisha, Tokyo, Japan

[21] Appl. No.: 414,308

[22] Filed: Sep. 2, 1982

[30] Foreign Application Priority Data

Sep. 7, 1981 [JP] Japan .................. 56-141526

[51] Int. Cl.³ ...................... B62K 25/04; B60G 17/06
[52] U.S. Cl. ..................................... 280/277; 280/703
[58] Field of Search ............... 280/275, 276, 277, 688, 280/690, 703; 180/219; 188/2 A

[56] References Cited

U.S. PATENT DOCUMENTS

| | | | |
|---|---|---|---|
| 3,942,821 | 3/1976 | Bock ..................................... | 280/277 |
| 3,989,261 | 11/1976 | Kawaguchi ......................... | 280/276 |
| 4,159,123 | 6/1979 | Petty .................................... | 280/276 |
| 4,212,481 | 7/1980 | Ribi ..................................... | 280/276 |
| 4,367,882 | 1/1983 | Alexander et al. .................. | 280/276 |
| 4,406,475 | 9/1983 | Miyakoshi et al. .................. | 280/277 |

FOREIGN PATENT DOCUMENTS

| | | | |
|---|---|---|---|
| 56-25008 | 3/1981 | Japan .................................. | 280/703 |
| WO82/00445 | 2/1982 | PCT Int'l Appl. .................. | 280/703 |

Primary Examiner—Joseph F. Peters, Jr.
Assistant Examiner—Donn McGiehan
Attorney, Agent, or Firm—Irving M. Weiner; Pamela S. Burt

[57] ABSTRACT

A front brake system for a motorcycle provided with a front suspension system comprising a link mechanism having a quadrilateral side configuration wherein an upper fork secured to the front end of a vehicle body frame so as to be pivotable to the right and left and a lower fork which supports a front wheel are interconnected through two front arms and two rear arms. The front brake system comprises a brake disk integrally fixed to the front wheel and held rotatably thereby and a brake caliper for braking the front wheel by pressing a brake pad against the brake disk, the brake caliper being disposed below the lower fork and behind a perpendicular line passing through a front wheel axle. The caliper is mounted so as to utilize space effectively and in a low position to lower the center of gravity, and a simplified anti-driving mechanism is provided.

5 Claims, 7 Drawing Figures

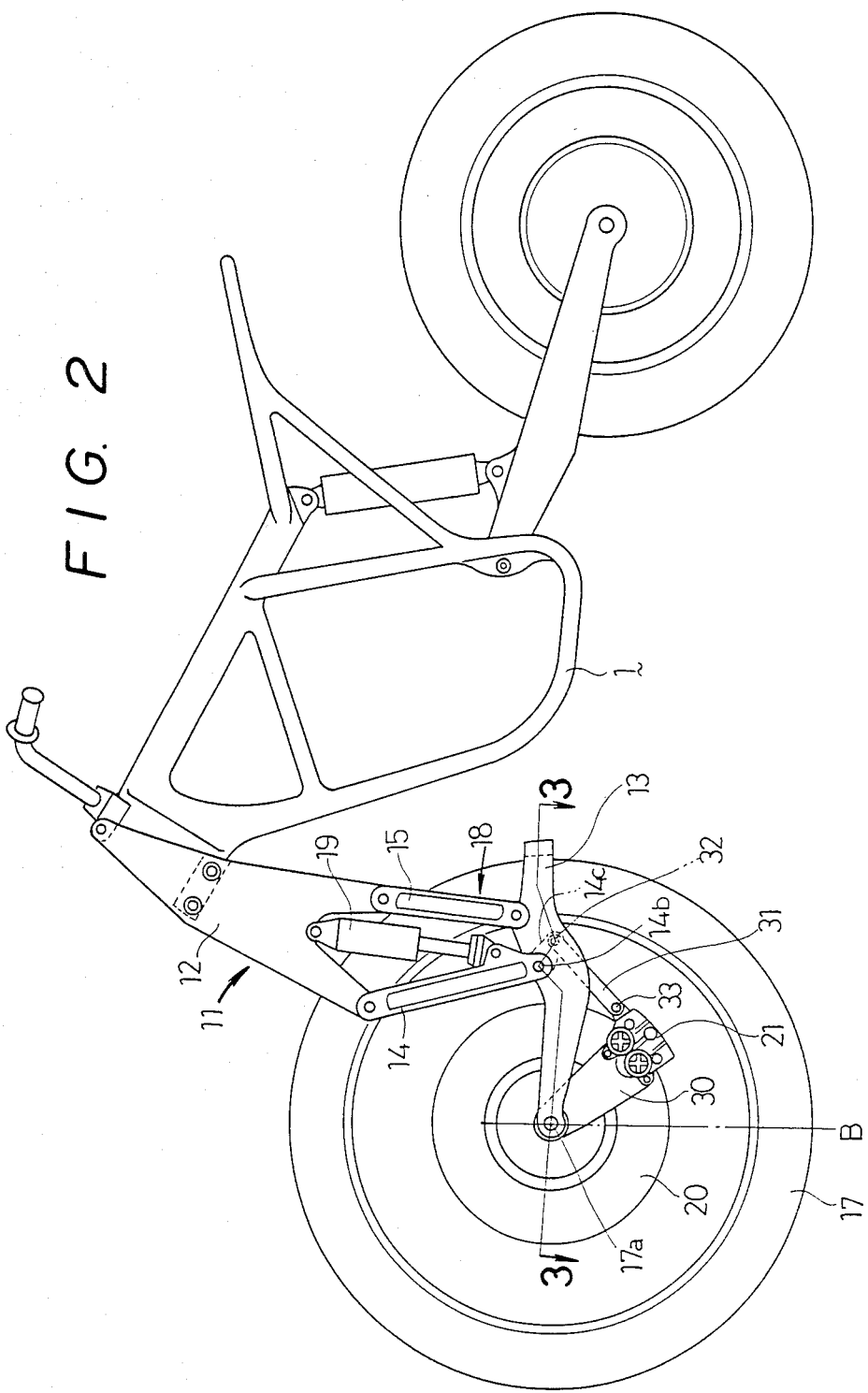

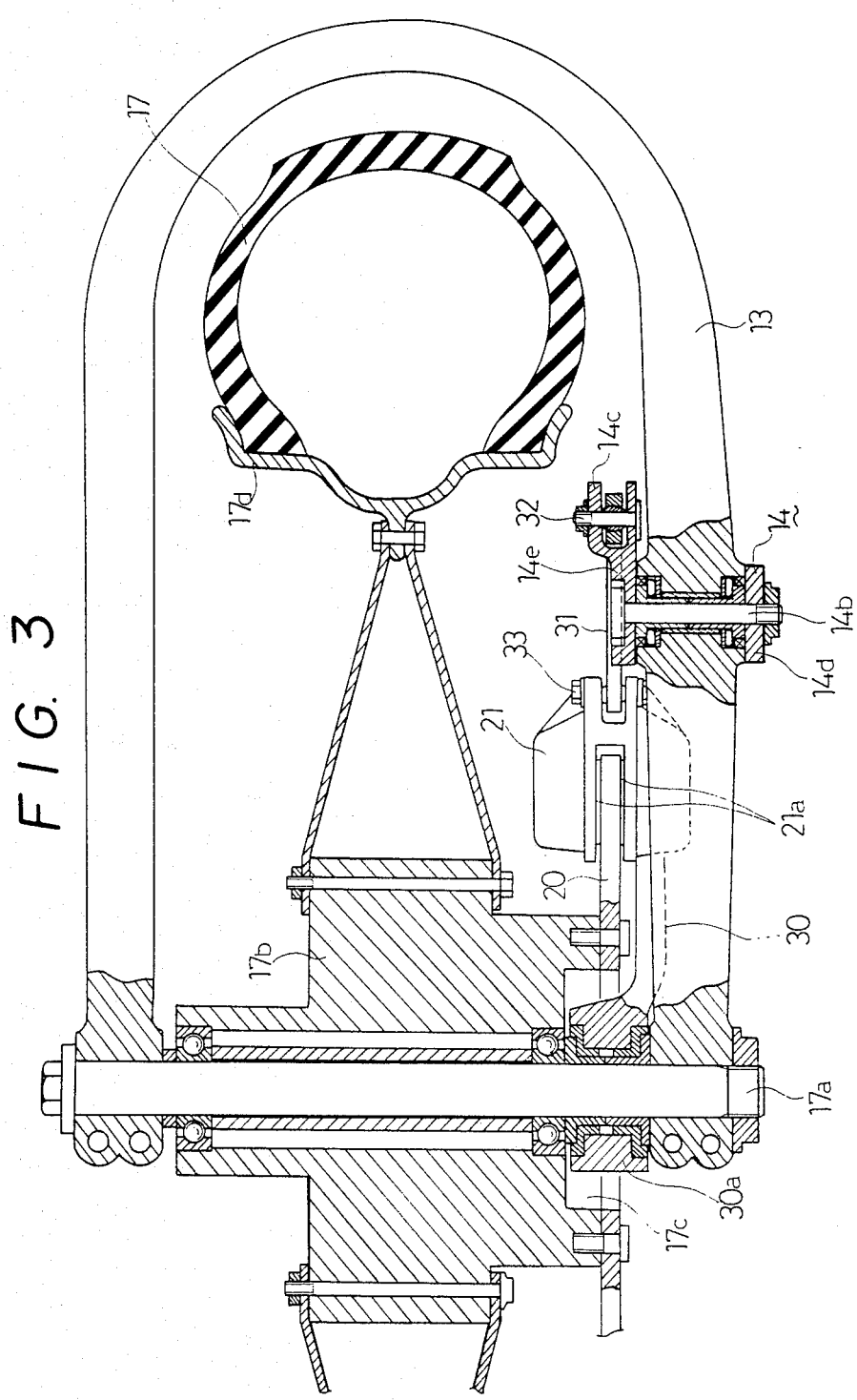

1

FRONT BRAKE SYSTEM FOR MOTORCYCLES

BACKGROUND OF THE INVENTION

1. Field of the Invention

The present invention relates to a front brake system in a motorcycle wherein the front suspension system comprises a link mechanism having a quadrilateral side configuration.

2. Description of Relevant Art

In a known motorcycle construction, an upper fork secured to the front end of a vehicle body frame so as to be pivotable to the right and left and a lower fork which supports a front wheel are interconnected through two front arms and two rear arms to define a link mechanism having a quadrilateral side configuration which serves as a front suspension system. Vertical movements of the front wheel in following undulations of the road surface are permitted by deformations of the quadrilateral link mechanism.

The present invention provides a brake system of the disk brake type for motorcycles which incorporate the aforesaid quadrilateral link mechanism type front suspension system.

SUMMARY OF THE INVENTION

The present invention provides a front brake system wherein a brake disk is integrally rotatably secured to a front wheel, and a brake caliper for braking the front wheel by pressing a brake pad against the brake disk is disposed in a position below a lower fork and behind a perpendicular line which passes through the front wheel axle.

It is an object of the present invention to provide a front brake system for motorcycles wherein the brake caliper is mounted by effectively utilizing a dead space of a link mechanism having a quadrilateral side configuration and which is further mounted in a low position so as to lower the center of gravity. The front brake system is effective in attaining a moderate anti-diving effect for preventing the front portion of the vehicle body frame from diving when the brake is applied.

The above and further objects, details and advantages of the present invention will become apparent from the following detailed description when read in conjunction with the accompanying drawings.

BRIEF DESCRIPTION OF THE DRAWINGS

FIG. 2 is a view similar to FIG. 1 illustrating a second embodiment of the present invention.

FIG. 3 is a partially sectional view taken along line 3—3 of FIG. 2.

DETAILED DESCRIPTION OF PREFERRED EMBODIMENTS

Figure 1:
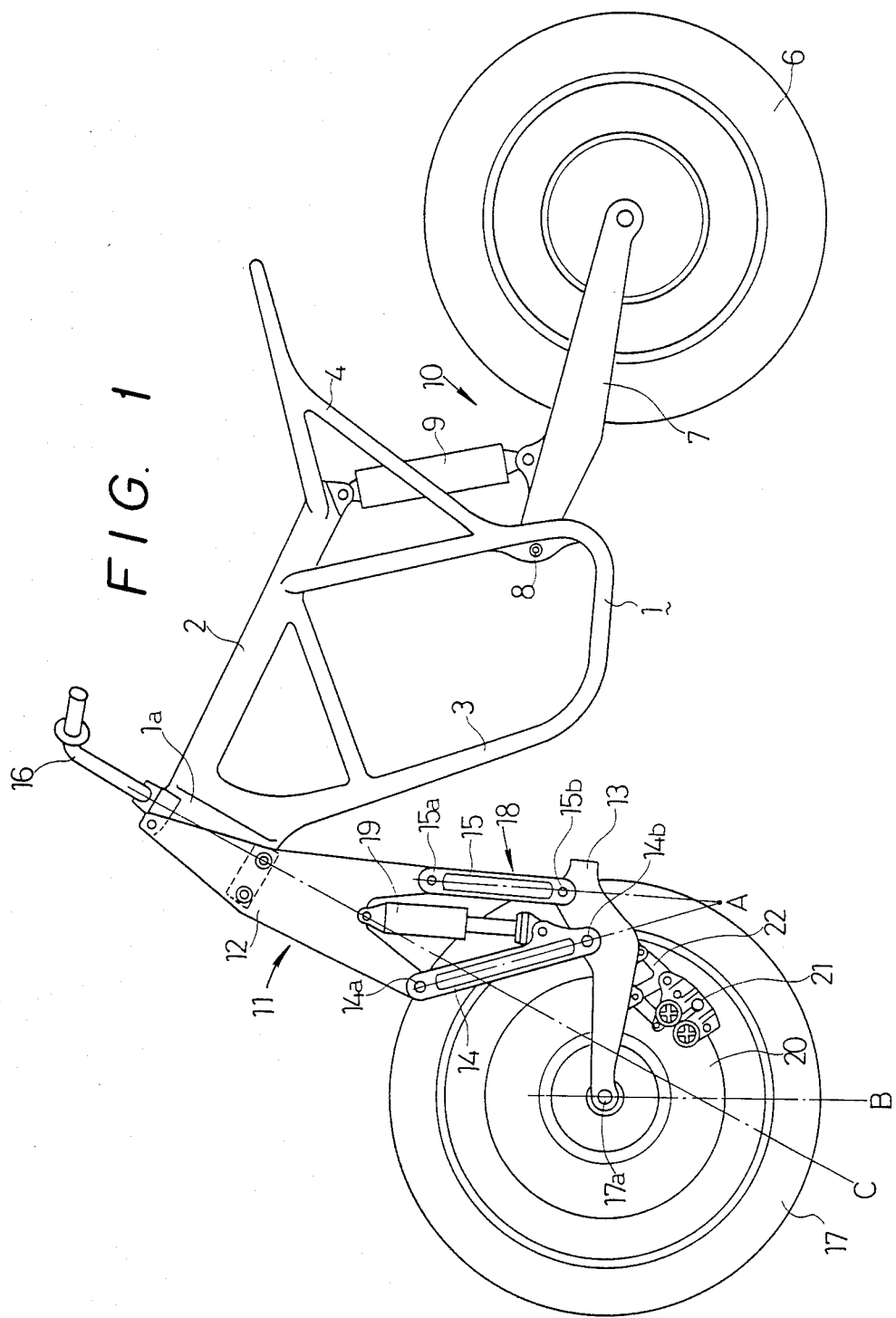
FIG. 1 is an overall side view of a motorcycle incorporating a first embodiment of the present invention.

With reference to FIG. 1, there is shown a first embodiment of the present invention, wherein a vehicle body frame 1 comprises a main frame 2, a down tube 3, and a rear frame 4. A rear fork 7 has a rear end which supports a rear wheel 6, while the front end thereof is secured to the vehicle body frame 1 so as to be vertically pivotable through a pivot shaft 8. A damper 9 for the rear wheel is mounted between an upper rear portion of the vehicle body frame 1 and the rear fork 7. Such arrangement defines a rear suspension system 10.

A front suspension system 11 is defined by an upper fork substantially horizontal lower fork 13, two front arms 14 and two rear arms 15, the arms 14 and 15 connecting the forks 12 and 13. The upper fork 12 is secured to the vehicle body frame 1 so as to be pivotable to the right and left and steerable by a handlebar 16 through a stem shaft inserted into a head pipe 1a at the front end of the frame 1. At the front end of the lower fork 13 is transversely mounted an axle 17a of a front wheel 17, and to the lower portion of the lower fork 13 thus supporting the front wheel 17 are pivotably connected the lower ends of the arms 14 and 15 through shafts 14b and 15b, respectively, the upper ends of the arms 14 and 15 being pivotably secured to the upper fork 12 through shafts 14a and 15a, respectively. Thus, the lower fork 13 is suspended from the upper fork 12 through the arms 14 and 15. In this manner, the front suspension system 11 comprises a pair of link mechanisms 18 each having a quadrilateral side configuration wherein the upper fork 12 is a relatively stationary link while the lower fork 13 and the arms 14 and 15 are movable links. A set including a front arm 14 and a rear arm 15 is provided for each of the right and left side members of the upper fork 12 and lower fork 13, and therefore the quadrilateral link mechanism 18 is defined on both right and left sides of the front wheel 17.

Vertical movements of the front wheel 17 in following undulations of the road surface are permitted by deformations of the quadrilateral link mechanism 18 wherein the arms 14 and 15 pivot about the shafts 14a and 15a, respectively, and the lower fork 13 pivots about an intersecting point A of extensions of the arms 14 and 15, as a momentary center. A fluid pressure damper 19 is disposed between two component members of the link mechanism 18, at least one of which comprises the foregoing movable link, i.e., between the upper fork 12 and the front arm 14 in the illustrated embodiment, and deformations of each link mechanism 18 and vertical movements of the front wheel 17 are absorbed and cushioned by the damper 19. The damper 19 may be disposed in any other position and connected with the link mechanism 18 by suitable means to allow it to perform the cushioning function thereof.

Inside the lower fork 13 is mounted a brake disk 20 coaxially with the front axle 17a. The brake disk 20, which is integrally secured to the front wheel 17, is rotatably supported by the lower fork 13. A brake caliper 21, which together with the brake disk 20 defines a front disk brake system, is disposed below the lower fork 13 and behind a perpendicular line B passing through the front wheel axle 17a. More particularly, in this embodiment the brake caliper 21 is attached to the lower surface of the lower fork 13 through a bracket 22. The brake caliper 21 is provided with a hydraulically operated brake pad (not shown), and the front wheel 17 is braked by pressure contact of such pad with the brake disk 20, whereby the motorcycle can be decelerated and stopped in conjunction with a rear brake system (not shown).

By disposing the brake caliper 21 in the position described hereinabove, a dead space formed under the lower fork 13, which space is open throughout deformations of the quadrilateral link mechanism 18, is effectively utilized. Further, the mounting height of the brake caliper 21 is lowered so as to lower the center of gravity. In addition, because the brake caliper 21 is disposed proximal a steering center axis C which passes through the head pipe 1a, the moment of inertia in steering the front suspension system 11 about the steering center axis C is effectively decreased.

A second embodiment of the present invention described hereinbelow includes the same brake caliper as in the first embodiment and therefore provides the foregoing advantages. In the second embodiment, the front suspension system in the motorcycle comprises a link mechanism having a quadrilateral side configuration, and the front brake system is a disk brake type comprising a brake disk and a brake caliper. Therefore, the same members as described in the first embodiment are designated by the same reference numerals, as is also the case with the subsequent embodiments. More particularly, reference numeral 1 designates a vehicle body frame, 11 a front suspension system comprising a link mechanism 18 having a quadrilateral side configuration, 12 an upper fork, 13 a lower fork, 14 and 15 arms, 19 a damper, 20 a brake disk, and 21 a brake caliper.

Referring now to FIGS. 2 and 3, there is illustrated the second embodiment of the present invention providing a moderate anti-diving effect, which is an improvement over the first embodiment. In the first embodiment, when the brake caliper 21 brakes the front wheel 17 by pressure contact of the brake pad with the brake disk 20, the lower fork 13 which supports the caliper 21 undergoes a pivoting force in a counterclockwise direction in FIG. 1 about the front wheel axle 17a caused by a frictional braking force of the pad, and therefore the diving of the front portion of the vehicle body frame 1 based on the moment about the center of gravity of the vehicle body at the time of braking can be prevented by the pivoting force of the lower fork 13 through the upper fork 12 and the arms 14 and 15, whereby an anti-diving effect is attained. However, with some particular characteristics of the vehicle body, for example, with a particular mounting angle of the arms 14 and 15 relative to the lower fork 13, the pivotal movement of the lower fork 13 may act as a thrusting-up force against the vehicle body frame 1 through the arms 14, 15 and the upper fork 12. To overcome such disadvantage, the second embodiment shown in FIGS. 2 and 3 is constructed so that a moderate anti-diving effect is attained while preventing a nose-up phenomenon of the frame 1 caused by the aforesaid thrusting-up force.

The brake caliper 21 is fixed to and held by a bracket 30 which is pivotably attached to the lower fork 13 about the front wheel axle 17a, and thus the caliper 21 is pivotable about the axle 17a. Integral with the front arm 14 is a tip portion 14c which projects obliquely downwardly from the lower connection end between the arm 14 and the lower fork 13 through the shaft 14b, and the tip portion 14c is connected through a torque rod 31 to the brake caliper 21 which is disposed below the lower fork 13 and behind the perpendicular line B passing through the front wheel axle 17a. When the brake caliper 21 brakes the front wheel 17 by pressure contact of a brake pad 21a with the brake disk 20 as will be described hereinbelow, the resultant frictional force causes the caliper 21 to pivot in a counterclockwise direction about the front wheel axle 17a together with the bracket 30, and this pivotal movement is transmitted to the arm 14 through the torque rod 31, so that the counterclockwise pivoting of the arm 14 about the shaft 14b interlocked with a diving motion of the front part of the vehicle body frame 1 based on the moment about the center of gravity of the vehicle body at the time of application of the brake is promoted, but only in a relatively small pivotal angle range of the arm 14 determined by the projecting angle and length of the tip portion 14c. More particularly, even if the arm 14 attempts to pivot a relatively large extent in a counterclockwise direction about the shaft 14b, such pivotal movement is impeded by the torque rod 31 because the caliper 21 is connected to the disk 20 by virtue of a frictional force, and consequently a moderate anti-diving effect is attained.

As shown in FIG. 3, which is a partially sectional view taken along line 3—3 of FIG. 2, the brake caliper 21 is disposed inside the lower fork 13 which is substantially U-shaped in plan, and the brake disk 20 is inserted between brake pads 21a of the caliper 21, the disk 20 being fixed with bolts or the like to a side of a central hub portion 17b of the front wheel 17. A base portion 30a of the bracket 30 which supports the caliper 21 is fitted in a recess 17c formed in the side of the hub portion 17b and is pivotably supported by the front wheel axle 17a. The lower end of the arm 14, which is connected to the lower fork 13 through the shaft 14b, is bifurcated into two projecting pieces 14d and 14e. The projecting piece 14e positioned inside the lower fork 13 projects rearwardly to form the tip portion 14c, and to the tip portion 14c is connected one end of the torque rod 31, while the other end of the torque rod 31 is pivotably connected to the caliper 21 through the shaft 33. As apparent from FIG. 3, in addition to the brake caliper 21, the torque rod 31 is also disposed inside the lower fork 13, and the caliper 21 and the torque rod 31 are disposed in a space formed between the hub portion 17b on the inside diameter side of the front wheel 17 and a rim portion 17d on the outside diameter side of the front wheel, and thus an effective utilization of the dead space is attained.

Figure 4:
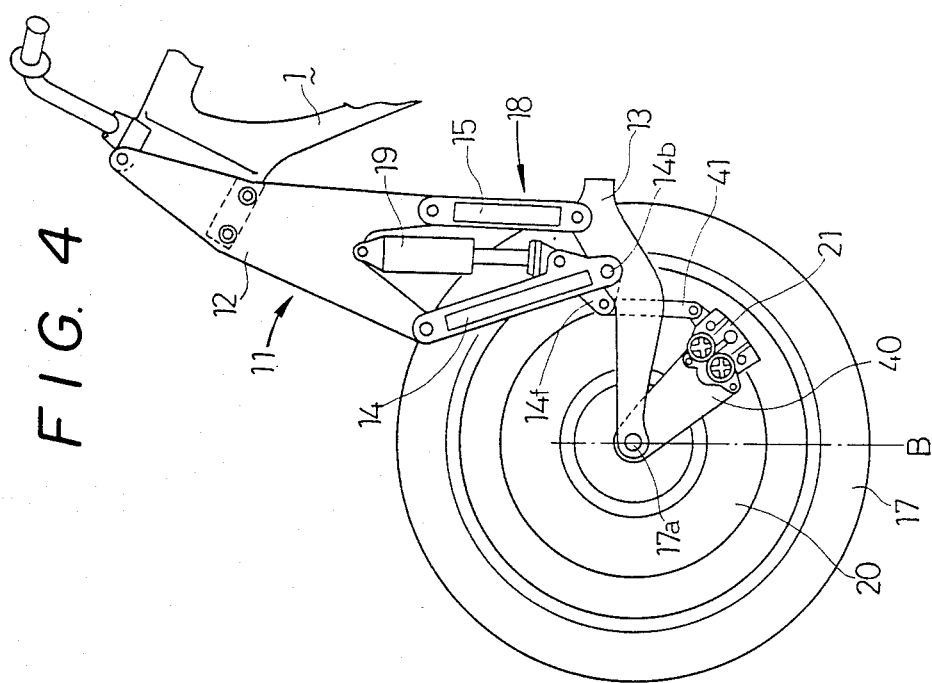
FIG. 4 is a side view of a principal portion of a motorcycle illustrating a third embodiment of the present invention.

Referring now to FIG. 4, there is illustrated a third embodiment of the present invention which, as in the second embodiment described hereinabove, also provides a moderate anti-diving effect. Also in this embodiment, the brake caliper 21 is fixed to and held by a bracket 40 which is attached to the lower fork 13 so as to be pivotable about the front wheel axle 17a, and the arm 14 and the caliper 21 are interconnected through a torque rod 41, however, the connection between the arm 14 and the torque rod 41 is made at a connecting boss portion 14f formed on the front surface of the arm 14 in a position higher than the pivoted portion between the arm 14 and the lower fork 13 through the shaft 14b. When the arm 14 attempts to pivot in a counterclockwise direction about the shaft 14b to produce diving of the front portion of the vehicle body frame 1 at the time of application of the brake, such pivotal movement of the arm 14 is impeded by the torque rod 41 because a frictional force is produced between the caliper 21 and the brake disk 20 by the braking operation, and thus a moderate anti-diving effect is attained.

Figure 5:
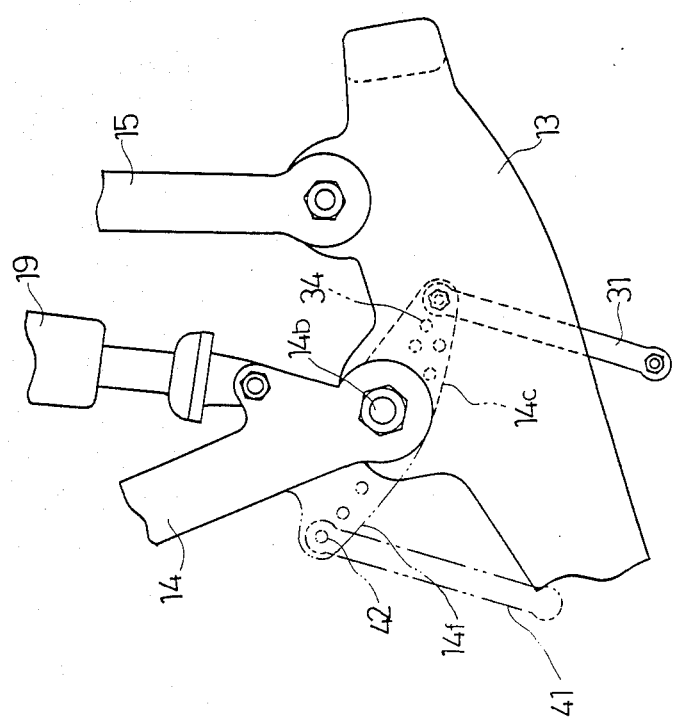
FIG. 5 is a view illustrating an embodiment of the invention which provides for adjustability of the anti-diving characteristic in the second and third embodiments.

In the second and third embodiments described hereinabove, a plurality of connection holes 34 or 42 may be formed in the tip portion 14c or the connecting boss portion 14f which is formed on the arm 14 for connection of the torque rod 31 or 41, at different distances from the pivoted portion between the arm 14 and the lower fork 13 through the shaft 14b, as shown in FIG. 5, thereby making the connecting position of the torque rod adjustable. As a result, the anti-diving characteristic can be made adjustable according to the distance between the aforesaid pivoted portion and the connection holes.

In the second and third embodiment, moreover, when the frictional force induced by braking of the front wheel 17 with the brake caliper 21 is of a magnitude which allows slipping to occur between the disk 20 and the brake pad, an effective cushionability of the front suspension system 11 is attainable while applying the brake because free deformations of the quadrilateral link mechanism 18 are permitted. Because the moving stroke of the caliper 21 induced by the pivotal movement of the brackets 30 and 40 about the front wheel axle 17a is small relative to the vertically moving stroke of the axle 17a along with deformations of the quadrilateral link mechanism 18 when advancing over undulations of the road surface, only a small force is required for operating the front suspension system 11 despite the provision of the caliper 21 and brackets 30 and 40, thus resulting in a favorable driving performance over gaps in the road surface.

Figure 6:
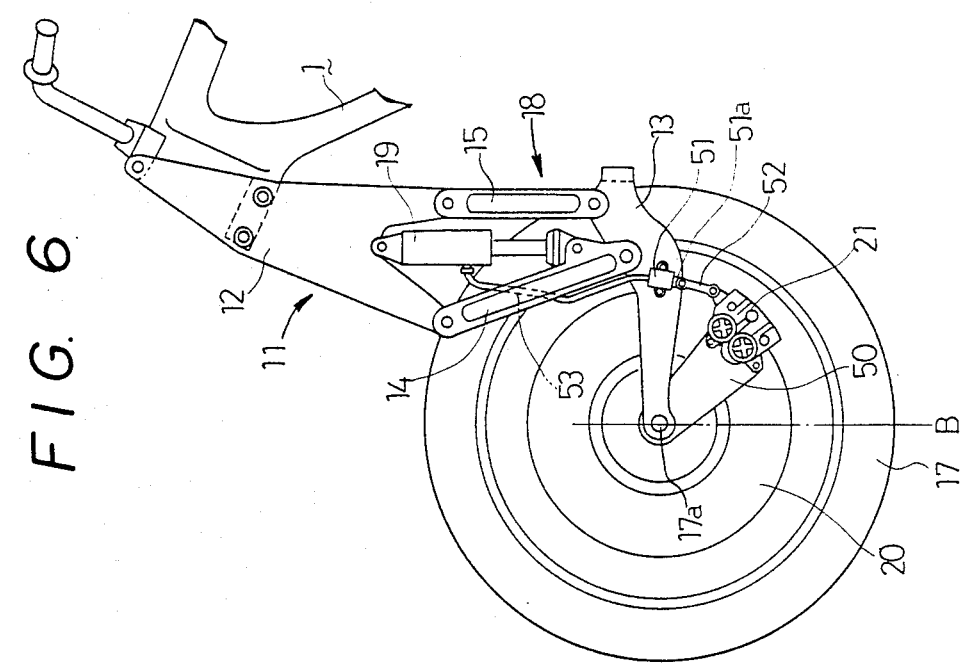
FIG. 6 is a view similar to FIG. 4 illustrating a fourth embodiment of the present invention.

Referring now to FIG. 6, there is illustrated a fourth embodiment of the present invention wherein the damping force characteristic of the damper 19 can be changed according to braking conditions of the front wheel 17. As in the second and third embodiments, the brake caliper 21 is fixed to and held by a bracket 50 which is attached to the substantially horizontal lower fork 13 so as to be pivotable about the front wheel axle 17a. Mounted on a side of the lower fork 13 is a pneumatic or hydraulic cylinder 51, and a piston rod 51a of the cylinder 51 is connected to the caliper 21 through the torque rod 52. The cylinder 51 is connected to the damper 19 through a pipe 53 so as to define pressure control means for controlling the fluid pressure of damper 19. When the front wheel 17 is braked by pressure contact of the brake pad with the brake disk 20, the caliper 21 pivots in a counterclockwise direction about the axle 17a, so that the air or oil within the cylinder 51 is compressed by the torque rod 52 and the piston rod 51a and is thereby fed through the pipe 53 to the contracting side or expanding side of the damper 19, and thus the damping force characteristic of the damper 19 adapted to produce the same force by virtue of the air or oil pressure is changed according to braking conditions. The anti-diving effect is also attained thereby.

Figure 7:
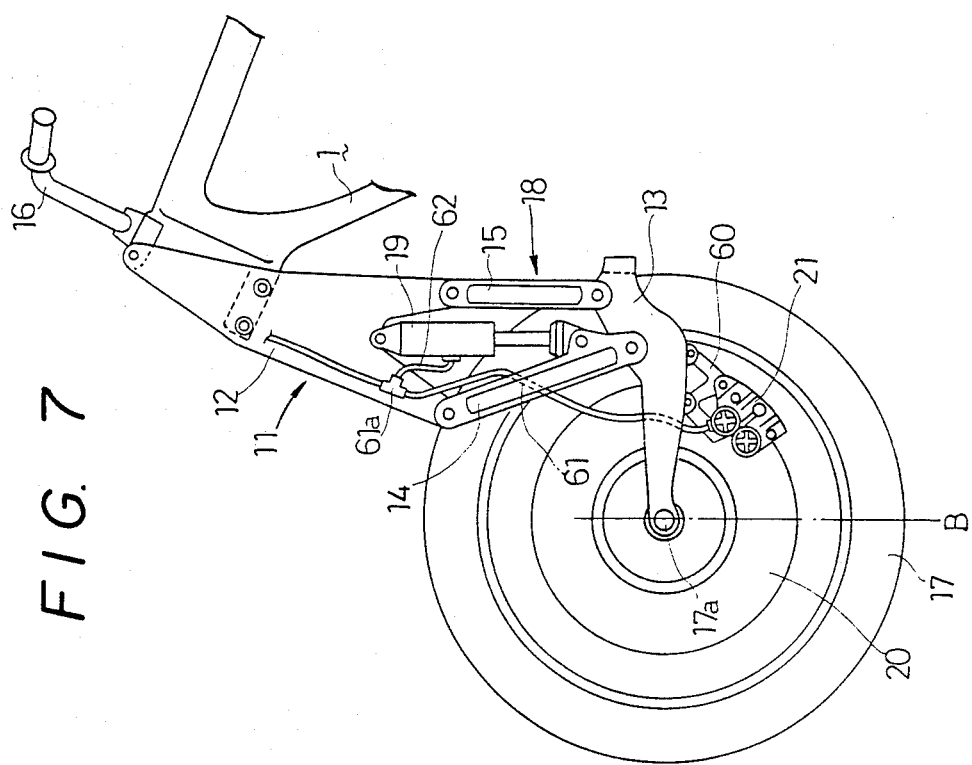
FIG. 7 is a view similar to FIG. 4 illustrating a fifth embodiment of the present invention.

Referring now to FIG. 7, there is illustrated a fifth embodiment of the invention wherein the damping force characteristic of the damper 19 can be changed in a more desirable manner by feeding oil to the damper 19 simultaneously with the feeding of oil pressure to the brake caliper 21. The caliper 21 is attached to the lower surface of the lower fork 13 through a bracket 60. Oil pressure is applied to the caliper 21 through a pipe 61 by operation of a brake lever (not shown) attached to the handlebar 16, and by such oil pressure a brake pad (not shown) is brought into pressure contact with the brake disk 20 to brake the front wheel 17. In this embodiment, the pipe 61 is branched at a joint portion 61a to a branch pipe 62 which is connected to the damper 19, thus permitting the oil in the pipe 61 to be fed to the contracting side or the expanding side of the damper 19, whereby the damping force characteristic of the damper 19 is made suitably adjustable and at the same time the anti-diving effect is also attained.

According to the present invention, as set forth hereinabove, in a motorcycle provided with a front suspension system which comprises a link mechanism having a quadrilateral side configuration, the brake caliper for braking the front wheel by pressing the brake pad thereof against the brake disk is disposed below the lower fork and behind a perpendicular line which passes through the front wheel axle. Therefore, the brake caliper is disposed by utilizing a dead space without affecting the deforming operation of the quadrilateral link mechanism, and the low mounting postion of the caliper also contributes to lowering of the center of gravity. Such an arrangement of the caliper further provides an anti-diving effect for preventing the front portion of the vehicle body frame from diving when the brake is applied.

Although there have been described what are at present considered to be the preferred embodiments of the invention, it will be understood that various modifications may be made therein without departing from the spirit or essential characteristics thereof. The present embodiments are therefore to be considered in all respects as illustrative, and not restrictive. The scope of the invention is indicated by the appended claims rather than by the foregoing description.

We claim:

1. In a motorcycle provided with a front suspension system comprising a link mechanism having a quadrilateral side configuration wherein an upper fork secured to the front of a vehicle body frame so as to be pivotable to the right and left and a lower fork which supports a front wheel are interconnected through two front arms and two rear arms, a front brake system comprising:
   a brake disc integrally fixed to said front wheel and held rotatably thereby;
   a brake caliper for braking said front wheel by pressing a brake pad thereof against said brake disc, said brake caliper being disposed below said lower fork and behind a perpendicular line passing through a front wheel axle; and
   one end of said brake caliper being pivotably connected to an axle portion and the other end thereof being pivotably connected to a tip end of one said arm through a torque rod.

2. A front brake system according to claim 1, wherein:
   the pivoted portion of said brake caliper to said axle portion and said torque rod are disposed inside said lower fork.

3. A front brake system according to claim 1, wherein:
   the position at which said torque rod is pivotably connected to the tip end of said arm is adjustable by a plurality of connection holes provided in the tip end of said arm at which said torque rod is pivoted.

4. In a motorcycle provided with a front suspension system comprising a link mechanism having a quadrilateral side configuration wherein an upper fork secured to the front of a vehicle body frame so as to be pivotable to the right and left and a lower fork which supports a front wheel are interconnected through two front arms and two rear arms, a front brake system comprising:

a brake disc integrally fixed to said front wheel and held rotatably thereby;

a brake caliper for braking said front wheel by pressing a brake pad thereof against said brake disk;

a fluid pressure damper which is provided for said link mechanism and expands and contracts according to deformations of said link mechanism;

pressure control means for controlling the fluid pressure of said damper;

said lower fork extending substantially horizontally and supporting at the front end thereof said front wheel;

said pressure control means being fixed to and supported by said lower fork;

said brake caliper having one end thereof pivotably connected to an axle portion, and being disposed below said lower fork and behind a perpendicular line passing through a front wheel axle; and a torque rod having one end thereof pivotably connected to the other end of said brake caliper and the other end thereof connected to said pressure control means so as to operate said pressure control means.

5. In a motorcycle provided with a front suspension system comprising a link mechanism having a quadrilateral side configuration wherein an upper fork secured to the front of a vehicle body frame so as to be pivotable to the right and left and a lower fork which supports a front wheel are interconnected through two front arms and two rear arms, a front brake system comprising:

a brake disk integrally fixed to said front wheel and held rotatably thereby;

a brake caliper for braking said front wheel by pressing a brake pad thereof against said brake disk;

a fluid pressure damper which is provided for said link mechanism and expands and contracts according to deformations of said link mechanism;

said lower fork extending substantially horizontally and supporting at the front end thereof said front wheel;

said brake caliper being attached to the lower surface of said lower fork and disposed behind a perpendicular line passing through a front wheel axle; and a pipe for applying an oil pressure to said brake caliper for the braking, said pipe being branched to said fluid pressure damper.

* * * * *